US007729932B2

(12) United States Patent
Yokota et al.

(10) Patent No.: US 7,729,932 B2
(45) Date of Patent: Jun. 1, 2010

(54) PROJECT ASSESSMENT SYSTEM AND METHOD

(75) Inventors: Takeshi Yokota, Tokyo (JP); Hisanori Nonaka, Tokyo (JP); Kenji Araki, Tokyo (JP); Youichi Nishikawa, Tokyo (JP); Makoto Kudoh, Tokyo (JP)

(73) Assignees: Hitachi, Ltd., Tokyo (JP); Hitachi Plant Engineering & Construction Co., Ltd., Tokyo (JP)

( * ) Notice: Subject to any disclaimer, the term of this patent is extended or adjusted under 35 U.S.C. 154(b) by 1553 days.

(21) Appl. No.: 10/685,839

(22) Filed: Oct. 14, 2003

(65) Prior Publication Data

US 2004/0111306 A1 Jun. 10, 2004

(30) Foreign Application Priority Data

Dec. 9, 2002 (JP) ............................ 2002-356509

(51) Int. Cl.
*G06F 17/30* (2006.01)

(52) U.S. Cl. .................................... 705/7; 705/8; 705/9

(58) Field of Classification Search ....................... None
See application file for complete search history.

(56) References Cited

U.S. PATENT DOCUMENTS

| | | | | |
|---|---|---|---|---|
| 5,166,878 | A * | 11/1992 | Poelstra | 701/200 |
| 5,815,413 | A * | 9/1998 | Hively et al. | 702/191 |
| 6,072,493 | A * | 6/2000 | Driskell et al. | 715/854 |
| 6,587,781 | B2 * | 7/2003 | Feldman et al. | 701/117 |
| 6,594,598 | B1 * | 7/2003 | Ishizuka et al. | 702/84 |
| 6,606,574 | B2 * | 8/2003 | Takanabe | 702/84 |

(Continued)

FOREIGN PATENT DOCUMENTS

| | | |
|---|---|---|
| JP | 2000-237938 | 9/2000 |
| JP | 2000-007656 | 1/2002 |

OTHER PUBLICATIONS

Yoshihiro Kuwazawa, "Making Full Use of Cutting Edge Information Technology, No. 6 Project Management Software, Paving the way for Risk Hypothesis and Verification, Challenge of Realizing Collaboration Between Tools" Network Computing, Ric Telecom Co., Ltd., Oct. 1, 1999, vol. 11, No. 10, pp. 74-77.

(Continued)

*Primary Examiner*—Romain Jeanty
*Assistant Examiner*—Brett Feeney
(74) *Attorney, Agent, or Firm*—Hogan & Hartson LLP

(57) ABSTRACT

A computer readable storage medium encoded with a project assessment program for assessing a project including a plurality of processes when executed by a computer computing forecasts of the project based on a set of information. At least one scheme by a user input is selected from a group of schemes including an estimation of mutual-correlation of estimated value pattern. Process planning information, up-to-date actual process information and forecast model information of each process included in the project is retrieved. The forecast model information of each process of the project is defined as probability distribution variations of a plurality of parameters of the processes, wherein the probability distribution variations are quantitative values of the project. Estimated values of variations in at least two parameters of the processes using the process planning information, the up-to-date actual process information and the forecast model information are computed.

7 Claims, 16 Drawing Sheets

U.S. PATENT DOCUMENTS

| | | | | |
|---|---|---|---|---|
| 6,621,508 | B1 * | 9/2003 | Shiraishi et al. | 715/810 |
| 6,728,297 | B2 * | 4/2004 | Rudolf | 375/145 |
| 6,952,688 | B1 * | 10/2005 | Goldman et al. | 706/45 |
| 7,209,846 | B2 * | 4/2007 | Tamaki et al. | 702/84 |
| 7,219,239 | B1 * | 5/2007 | Njemanze et al. | 726/3 |
| 7,243,064 | B2 * | 7/2007 | Paris | 704/219 |
| 7,269,798 | B2 * | 9/2007 | Nonaka et al. | 715/804 |
| 7,318,039 | B2 * | 1/2008 | Yokota et al. | 705/7 |
| 2001/0032029 | A1 * | 10/2001 | Kauffman | 700/99 |
| 2002/0103793 | A1 * | 8/2002 | Koller et al. | 707/3 |
| 2003/0179241 | A1 * | 9/2003 | Nonaka et al. | 345/779 |
| 2003/0225605 | A1 * | 12/2003 | Yokota et al. | 705/7 |
| 2005/0080552 | A1 * | 4/2005 | Feldman et al. | 701/120 |
| 2008/0082388 | A1 * | 4/2008 | Fishman | 705/8 |

OTHER PUBLICATIONS

Shigeru Yamada, "Software/Introduction to Management Model (Conclusion) bit", Kyoritsu Shuppan Co., Ltd., Mar. 1, 1991, vol. 23, pp. 64-71.

* cited by examiner

FIG.3

| | Code | Item | Example |
|---|---|---|---|
| 101 | 0 | Process Code | 1 |
| 102 | 1 | Job Name | weld of pipe 1 |
| 103 | 2 | Job Code | 1 |
| 104 | 3 | Part Code | 45 |
| 105 | 4 | Contractor Code | 12345 |
| 106 | 5 | Planned Material Quantities | 100 |
| 107 | 6 | Planned Workmen | 10 |
| 108 | 7 | Planned Workdays | 5 |
| 109 | 8 | Planned Man-Days | 50 |
| 110 | 9 | Planned Starting Date | 50 |
| 111 | 10 | Critical Processes in Pre-Sequential Process: | 3 |
| 112 | 11 | Critical Processes in Post-Sequential Process: | 2 |
| 113 | 12 | Critical Starting Date: | 45 |
| 114 | 13 | Critical Completion Date: | 60 |

FIG.4

| | Code | Item | Example |
|---|---|---|---|
| 201 | 0 | Actual Material Quantities (accumulation) | 250 |
| 202 | 1 | Actual Man-Days | 5000 |
| 203 | 2 | Actual Starting Date | 52 |
| 204 | 3 | Actual Ending Date | 75 |

FIG. 5

| | Code | Item | Example |
|---|---|---|---|
| 301 | 0 | Job code | 1 |
| 302 | 1 | Average of Starting Date Variations | 0 |
| 303 | 2 | Standard Deviation of Starting Date Variations | 1.2 |
| 304 | 3 | Minimum Allowance for Starting Date Variation | -2 |
| 305 | 4 | Maximum Allowance for Starting Date Variation | 3 |
| 306 | 5 | Average of Elementary Unit Variations | 0.5 |
| 307 | 6 | Standard Deviation of Elementary Unit Variations | 3.5 |
| 308 | 7 | Minimum Allowance for Elementary Unit Variation | -2.5 |
| 309 | 8 | Maximum Allowance for Starting Date Variation | 10 |

FIG.6

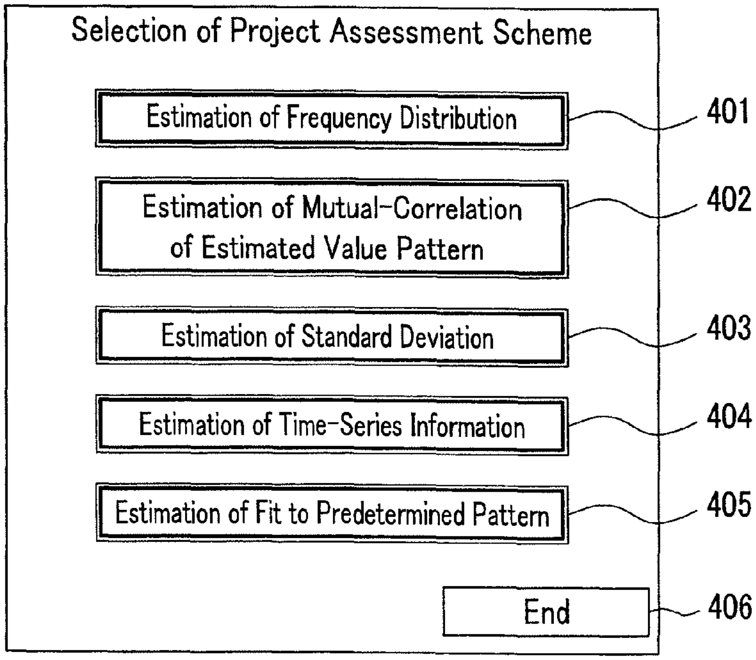

| First Week | Second Week | ... | Last Week | |
|---|---|---|---|---|
| First Week | Second Week | ... | Last Week | |
| SIM Times = First Estimate | SIM Times = First Estimate | ... | SIM Times = First Estimate | |
| SIM Times= Second Estimate | SIM Times= Second Estimate | ... | SIM Times= Second Estimate | |
| ... | ... | ... | ... | |
| SIM Times = n-th Estimate | SIM Times = n-th Estimate | ... | SIM Times = n-th Estimate | |

FIG.16

| | Estimation | Evaluation Value |
|---|---|---|
| 422 | Starting Date | 124.258 |
| 423 | Ending Date | 54.120 |
| 424 | Elementary Unit | 2.147 |
| 425 | Man-Days | 12.785 |

| | Process 01 | Process 02 | ··· | Process n |
|---|---|---|---|---|
| Process 01 | 1 | 0.875 | ··· | −0.247 |
| Process 02 | 0.875 | 1 | ··· | 0.725 |
| ··· | ··· | ··· | ··· | ··· |
| Process n | −0.247 | 0.725 | ··· | 1 |

FIG.18

| | Evaluation Value | |
|---|---|---|
| Standard Deviation excluding Process 01 | 0.874 | 427 |
| Standard Deviation excluding Process 02 | 2.457 | |
| ··· | ··· | |
| Standard Deviation excluding Process n | 0.975 | |

| Accumulation Cost | Job Group 01 | Job Group 02 | ··· | Job Group n |
|---|---|---|---|---|
| | | | | 9 |
| | | | | 7 |
| | | | | |
| | | | | 1 |

430

| Accumulation Day | Job Group 01 | Job Group 02 | ··· | Job Group n |
|---|---|---|---|---|
| | | | | 6 |
| | | | | 1 |
| | | | | |
| | | | | 1 |

429

| Accumulation Man-Days | Job Group 01 | Job Group 02 | ··· | Job Group n |
|---|---|---|---|---|
| | | | | 4 |
| | | | | 6 |
| | | | | |
| | | | | 1 |

428

| Elementary Unit | Job Group 01 | Job Group 02 | ··· | Job Group n |
|---|---|---|---|---|
| Job Group 01 | 1.000 | 0.875 | ··· | -0.247 |
| Job Group 02 | 0.875 | 1 | ··· | 0.725 |
| ··· | ··· | ··· | ··· | ··· |
| Job Group n | -0.247 | 0.725 | ··· | 1 |

FIG.20

| | Shortage of Man-Days (436) | Delay of Completion (437) | Large Change of Specitications (438) | Large Supplementation of Specitications (439) |
|---|---|---|---|---|
| 432 Task Operation Term | 0.857 | 0.957 | -0.875 | 0.974 |
| 433 Elementary Unit | 0.635 | -0.257 | -0.253 | 0.363 |
| 434 Cost | -0.278 | 0.875 | -0.367 | 0.1245 |
| 435 Man-Days | -0.247 | 0.725 | 0.873 | 0.541 |

| | Man-Hour Shortage | Delay of Completion | Degree of Specification Change | Degree of Specification Supplementation |
|---|---|---|---|---|
| Process Term | 0.857 | 0.957 | −0.875 | 0.974 |
| Elementary Unit | 0.635 | −0.257 | −0.253 | 0.363 |
| Cost | −0.278 | 0.875 | −0.367 | 0.1245 |
| Man-Days | −0.247 | 0.725 | 0.873 | 0.541 |

PROJECT ASSESSMENT SYSTEM AND METHOD

The present application claims foreign priority to Japanese application 2002-356509, which is incorporated by reference in its entirety.

FIELD OF THE INVENTION

This invention relates to a computer process for a project assessment and a computerized project assessment system for project assessment and displaying the project assessment result.

BACKGROUND OF THE INVENTION

In the conventional project assessment, the determination of the projected total cost and process parameters for completion have been estimated based on the assumption that the remaining jobs are carried out following the process efficiency calculated by the actual progress information up to the time of the assessment. Referring to the result of the assessment, the project leaders have been assessing the project based on their own experiences and senses. To more accurately estimate the total cost and the process parameters for completion, a computer estimation method has been provided including the updated information of the process planning and variations of the process parameters necessary to carry out each process of a project.

There are several known examples of the conventional method such as one estimating a task progress using an updated actual progress information (JP, 2002-007656, A) and one using a relative precedence/delay computed by a schedule and progress information of the manufacturing process (JP, 2000-237938, A), etc.

REFERENCES

Patent 1: JP publication 2002-007656, A

Patent 2: JP publication 2000-237938, A

In the above conventional methods, each process of a project is estimated by a predetermined assessment criterion and that estimation is used for the assessment of the project. However, judgment and identification of the issues depend on the experiences or the senses that the project manager has developed for his owns, and it is difficult to precisely specify the bottle necks or the superiorities of the assessed project.

The forecast of the project has been done with a simple method such as an estimation of the future job hours by using the job efficiency that has been obtained over all past jobs up to the present job, therefore such estimation is sometimes not sufficient for the forecast of the project with a complexity of elemental issues that are interrelated.

Therefore, is necessary to assess the bottle necks and the superiorities of the project for assessment of the project. And it is desirable that the fundamental information used for the assessment of the project be refined and improved, to contribute to the goal of reflecting the real status of the project.

The purpose of this invention is to provide a computer process for project assessment method and a computerized project assessment system for forecasting a projects based on actual progress status and real issues.

SUMMARY OF THE INVENTION

This invention is to solve the above problems and features that a project assessment system that assesses the forecast of the project, which includes a plurality of processes, comprises a storage devices to store and retrieve the process planning information of the project, up-to-date actual progress information and the forecast model information that defines the estimated variations of the major quantitative parameters, a CPU to calculate the estimate of at least one of the parameters and evaluate whether the estimate of at least of the parameters or a comparison involving the estimate satisfies a predetermined criteria.

The above forecast model gives the definitions of the variations of various critical conditions over processes, such as starting dates of the processes and job volume in the processes, by using a probability distribution.

The forecast is simulated by tracing the actual project progresses up to the present time to assess the project, and the estimates are calculated for the assessment of such forecast of the projects. The resultant estimation is carried out with the evaluation values of the frequency distributions, the mutual correlations, and the standard deviations of the project parameters (as starting dates, ending dates, job volume, man-hour, job materials, job costs). The time-series variation of each project parameter and the result of the comparison between the time-series variation pattern of the project parameters and that of a typical case, when a trouble occurs regarding a selected similar project parameter, are calculated for the amendment of such evaluation values. These evaluation values are displayed for the project assessment.

BRIEF DESCRIPTION OF THE DRAWINGS

FIG. 3 is a data format of a Process Planning Data Base.

FIG. 4 is a data format of an Actual Progress Information Data Base.

FIG. 5 is a data format of a Forecast Model Data Base.

FIG. 6 is an explanatory drawing of the graphic presentation for the selection of the project assessment scheme.

FIG. 16 is a data format of evaluation values in an assessment scheme of frequency distribution.

FIG. 17 is a data format of evaluation values in an assessment scheme of mutual-correlation of estimated value pattern.

FIG. 18 is a data format of evaluation values in an assessment scheme of standard deviation.

FIG. 19 is a data format of evaluation values in an assessment scheme of time-series information.

FIG. 20 is a data format of evaluation values in an assessment scheme of fit to predetermined pattern

PREFERRED EMBODIMENT OF THE INVENTION

Using the drawings of the FIG. 1 to the FIG. 27, the details of the embodiments of this invention will be explained as follows.

Figure 1:
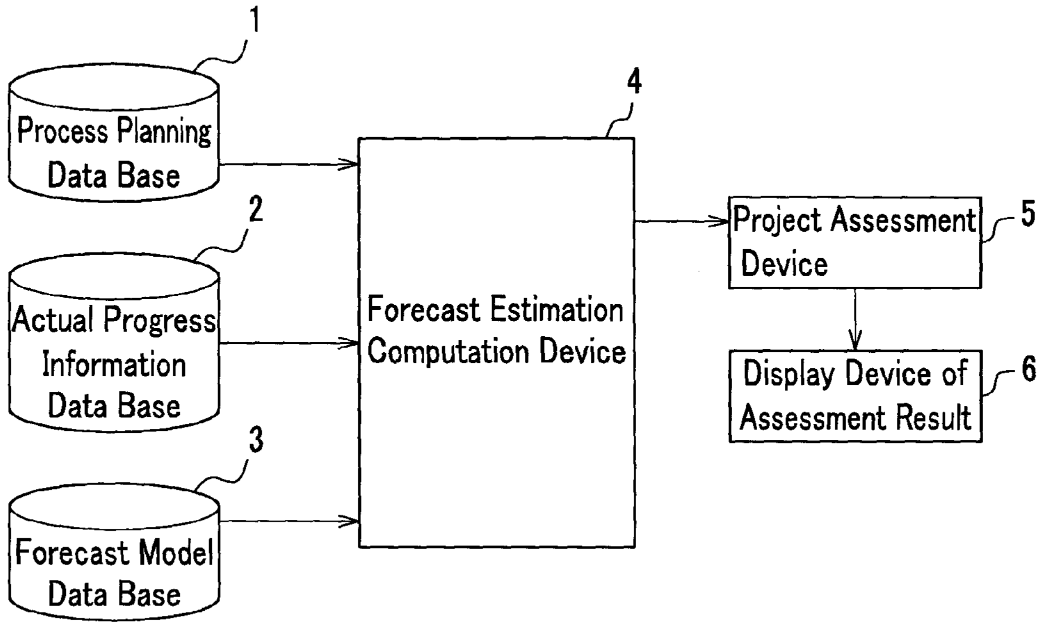
FIG. 1 is a drawing that shows a fundamental composition of a project assessment system.

FIG. 1 shows the components of a computerized project assessment system of the first embodiment. By way of an example, a construction project in civil engineering is the objective project assessed in this embodiment. The computerized project assessment system includes a Process Planning Data Base 1, an Actual Process Information Data Base 2, a Forecast Model Data Base 3, a Forecast Estimation Computation Device, a Project Assessment Device and a Display Device for Assessment Result.

When the project assessment is in operation, the project planning information stored in the Process Planning Data Base 1 and the actual progress information (such as the project progress status etc.) stored in the Actual Progress Information Data Base 2 are compared, and the up-to-date task status of the project is assessed. For the assessment, the forecast variation is defined by a probability distribution model based on the actual progress information and various quantitative information (such as task operation term, job volume (defined by quantitative measures of working results), workman, job material, elementary unit (=man-hour/material quantities), etc.). The estimated variation of the forecast is computed by the Forecast Estimation Computation Device 4. In addition, the assessment of the project (including identification and clarification of the problems in the project planning, etc) is carried out by a quantitative evaluation of the estimates in the Project Assessment Device 5, and the assessment result is displayed on the Display Device for Assessment Result 6.

Figure 2:
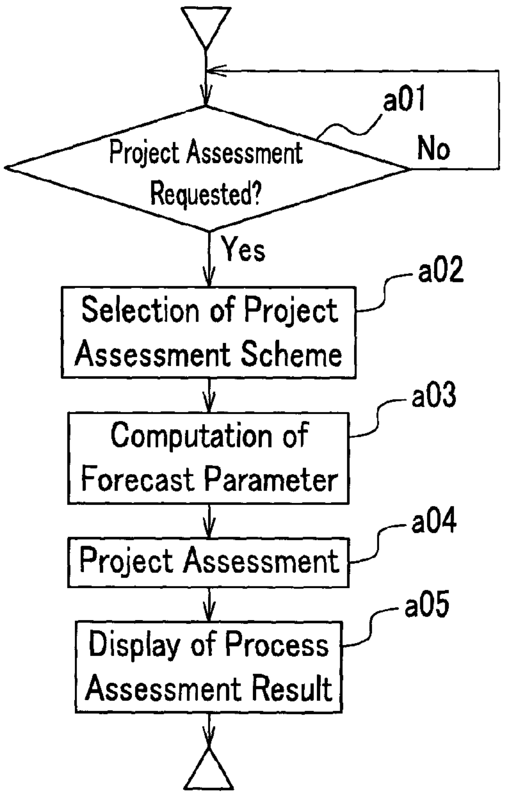
FIG. 2 is a computer-process flow that shows the overall present project assessment system.

Overall process flowchart is shown in FIG. 2. At the judgment step (a01), the request for project assessment by the user is checked, and the step goes to the process (a01) if there is no request for project assessment and to the Selection of Project Assessment Scheme (a02) if there is a request for project assessment. At the step (02*a*), a project assessment scheme can be arbitrarily selected by the user. At the step (a03), the estimated variations of the forecast of the various quantitative information necessary for assessment scheme, selected at step (a02), are computed. At the step (a04), the project assessment is carried out on the basis of the project assessment scheme selected at the step (a02) and by using the estimates computed at the step (a03). At the step (a05) Display of Process Assessment Result, the result of the project assessment carried out at the step (a04) is displayed for the user.

Further details are presented by way of examples below. FIG. 3 shows an example of the planning data kept in the Process Planning Data Base 1. The information shown in the item column is recorded in the data base for processes comprising the project. The recorded items include the Process Code 101 uniquely identifying the process in the project (it's an unique number identifying the process), the Job Name 102 identifying a particular job of the process, the Job Code (also an unique number) 103 which represents the kind of the jobs carried out in the process, the Part Code (here, also an unique number) 104 identifying the objective (goods) for the job of the project, the Contractor Code (here, also an unique number) 105 identifying the contractor for the job, the Planned Materials 106 identifying the materials needed for the job, the Planned Workmen 107 lists the planned workmen need for the job, and the Planned Workdays 108 lists the planned workdays needed to complete the job, the Planned Man-days 109 (estimated workmen×days), and the Planned Starting Date 110 listing the date to start the operation of the job necessary for the process. Moreover, the recorded items include Critical Processes in Pre-Sequential Process 111 that is the quantity of processes necessary to be completed before the job is carried out in the process, Critical Processes in Post-Sequential Process 112 that is the quantity of processes to start after the job is completed, the Critical Starting Date 113 that is the earliest date when the job necessary for the process can start and, the Critical Completion Date 114 that is the latest date when the job to be carried out in the project is completed.

FIG. 4 shows an example of the actual progress data kept in the Actual Progress Information Data Base. The actual progress data shown in FIG. 4 include those of the processes comprising the project. The recorded items are, for example, the Actual Materials (accumulation) 201, which is an up-to-date, cumulative quantity of the material processed by is the jobs that have been carried out in the process, the Actual Man-Days (accumulation) 202 which is a cumulative, up-to-date man-days spent for jobs necessary for the process, the Actual Starting Date 203 which is the start of jobs necessary for the process, and the Actual Ending Date 204 which is the completion date of the jobs necessary for the process. For these items, the Actual Starting Date 203 and the actual ending date 204 are not recorded for the case when the process has not started and completed, respectively.

FIG. 5 shows an example of the model data kept in the Forecast Model Data Base 3. The Forecast Model Data Base 3 stores the items shown in FIG. 5 for every kind of jobs in the project. The stored items include the Job Code 301 for which the forecast model is defined, the Average 302 and the Standard Deviation 303 that define the probability distribution (Gaussian distribution) of the variations to the starting date of the job identified by the Job Code 301. The Minimum Allowance 304 and the Maximum Allowance 305 are the definitions of the minimum and the maximum obtained in the above probability distribution of the variations. The variations of the elementary unit (elementary unit=man-days/material quantities) of the job which belongs to the kind of jobs identified by the Job Code 301 is defined by a probability distribution having the Average 306 and the Standard Deviation 307. The Minimum Allowance 308 and the Maximum Allowance 309 are the minimum and the maximum obtained in the above probability distribution of the variations.

In computing the estimation of the project parameters by the Forecast Estimation Computation Device 4, users select the assessment scheme for the project. FIG. 6 shows an example of the display to select the assessment scheme. The schemes include Estimation of Frequency Distribution 401, Estimation of Mutual-Correlation of Estimated Value Pattern 402, Estimation of Standard Deviation 403, Estimation of Time-Series Information 404, and Estimation of Fit to Predetermined Pattern 405. When End 406 is selected, this system ends.

Figure 7:
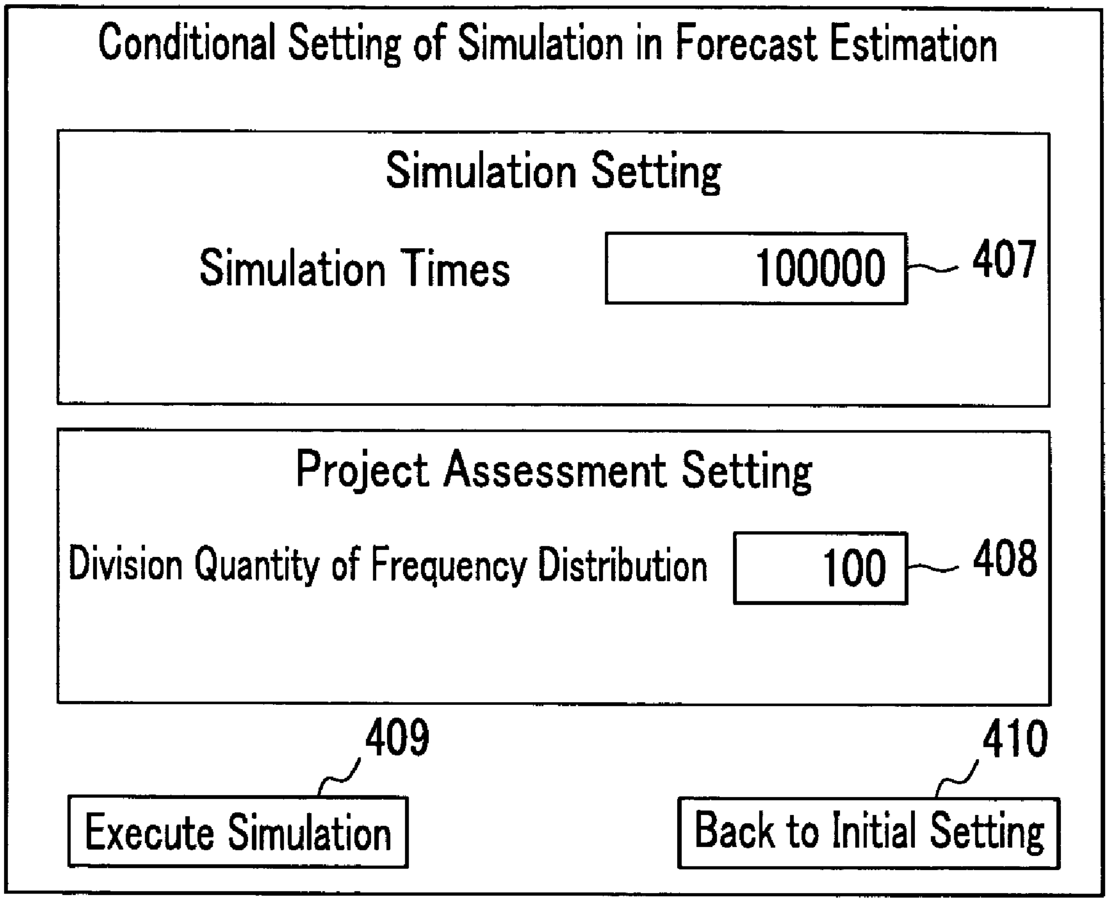
FIG. 7 is an explanatory drawing of the graphic presentation for the conditional setting of simulation in forecast estimation.

After selecting the project assessment scheme on the selection display, the execution conditions for the simulation that computes the estimates of the quantitative values necessary for the assessment scheme, shown in FIG. 7, are set. The conditions to be set are Simulation Times 407 and Division Quantity of Frequency Distribution 408. However, the Division Quantity of Frequency Distribution 408 is only set when Estimation of Frequency Distribution is selected. After setting the necessary simulation conditions, the simulation process starts by selecting Execute Simulation 409. When Back to Initial Setting 410 is selected, the simulation stops and the display presents the selection graphic for the project assessment scheme as shown in FIG. 6.

Figure 8:
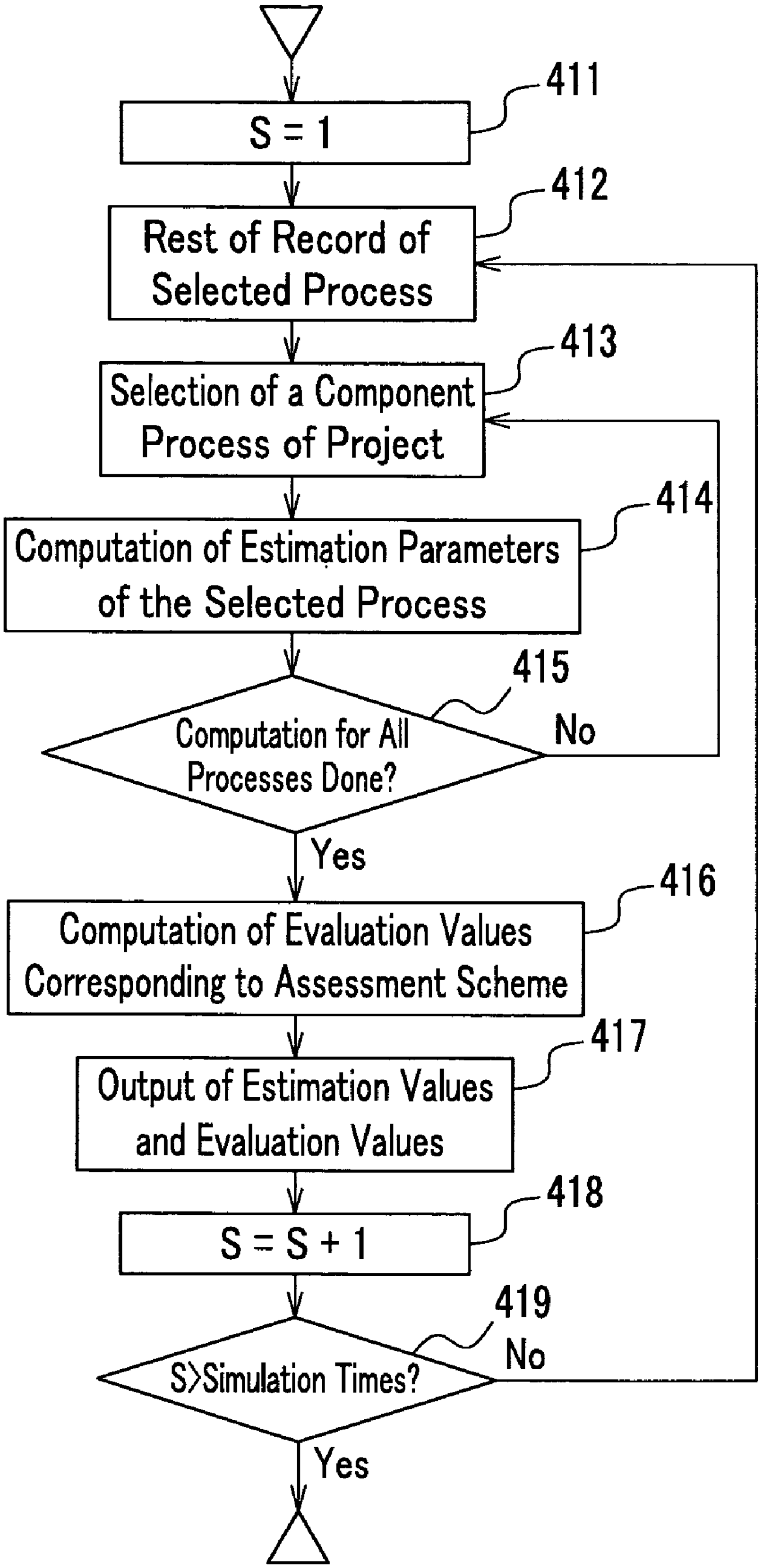
FIG. 8 is a computer-process flow that shows the overall process flow of a Forecast Estimation Computation Device.

FIG. 8 shows the computer process flow of Forecast Estimation Computation Device. At the step (411), the variable S that shows the simulation times is set to be unity. At the step (412), the recorded information of the process, for which a previous computation of estimation parameters (414) has been completely, is reset. At the step (413), one of the processes not having completed the Computation of Estimation Parameters (step 414) (indicated by the lack of record) is selected. At the step (414), the estimated starting date, the estimated elementary unit of the job, the estimated ending date, and the estimated man-days (the estimated values of parameters) are computed. The detail contents of the step (414) will be explained in FIG. 9.

At the step for judgment (415), it is judged whether all processes have completed the computation of estimation step (414), by referring the recording information of the is completion of such forecast for the processes. If the forecasts have not been carried out for all processes, then the step goes back to the step (413); and if they have been done for all processes, then the step advances to the step (416). At the step (416), the estimated values computed in the step (414) is processed in response to the assessment scheme that the user selected on the selection graphic for selecting an assessment scheme, as shown in FIG. 6, and the evaluation values for the project assessment are computed. The details of computer processing (416) according to each assessment scheme are explained in FIG. 10 to FIG. 14. At the step (417), the estimated values and the evaluation values computed at steps (414) and (416), respectively, are output as output data. The formats of the output data will be explained in detail by using FIG. 15 to FIG. 20, At the step (418), the variable S that indicate simulation times is incremented, and the at the step (419), the variable S for simulation times is judged whether it is more than the simulation times (407) set at the execution conditions shown in FIG. 7. If it is equal to or less than the simulation times set at the execution conditions, then the step advances to the step (412); and if it is more, then the computer processing of the Forecast Estimation Computation Devices ends.

Figure 9:
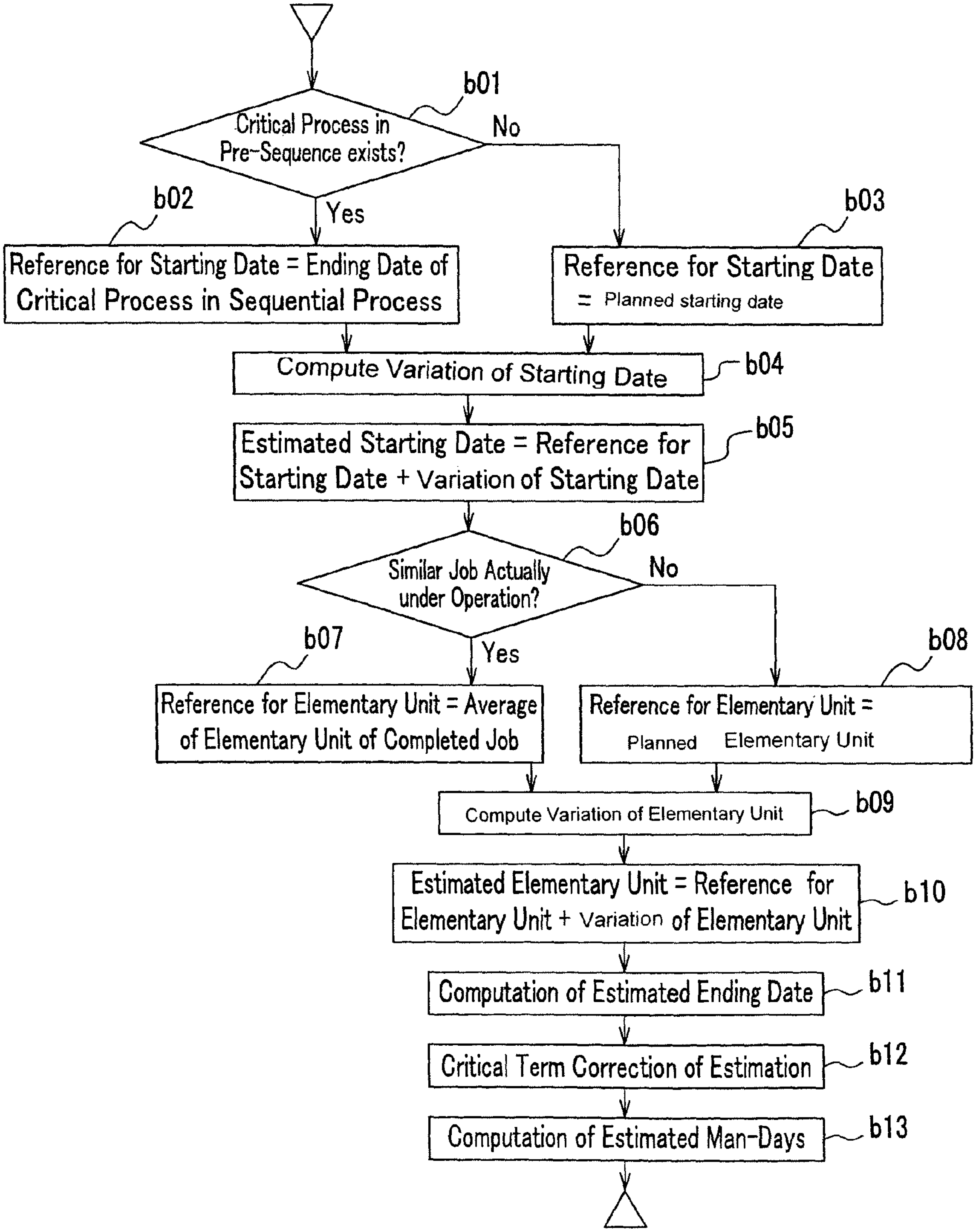
FIG. 9 is a computer-process flow that shows the detail process flow of a Forecast Estimation Computation Device.

The detail computation process flow of the step (414) is shown in FIG. 9. At the judgment step (b01), it is judged by using the information stored in the Process Planning Data Base 1 whether the objective process has the critical processes in pre-sequential process, AND the step advances to step (b02) if the objective process has the critical processes in pre-sequential process, and advances to step (b03) if the objective process does not have the critical processes in pre-sequential process. At the step (b02), the reference for is the starting date of the objective process is set to be the ending date of the critical process (the actual ending date if the objective process has been completed, or the estimated ending date if the objective process has not been carried out). At the step (b03), the reference for the starting date of the objective process is set to the planned starting date.

At the step (b04), the estimated value of the variation of the starting date is computed by using the information of probability distribution model of the variations of the starting date retrieved from the Forecast Model Data Base 3. Specifically, a reference for the variation is obtained by the equation (1) with the standard normalized random numbers computed by Moro algorism.

(Reference for Variation)=(Standard Normalized Random Numbers)×(Standard Deviation(300))+(Average(302)) (1)

After judging whether the reference for variation obtained by the equation (1) is within the range between the Minimum Allowance for Starting Date Variation (304) and the Maximum Allowance for Starting Date Variation (305), (Variation of Starting Date)=(Reference for Variation) is set when the reference for the variation is within such range. And, if the Reference for Variation is smaller than the Minimum Allowance for Starting Date Variation (304), then (Variation of Starting Date)=(Minimum Allowance for Starting Date Variation (304)) is set. If the reference for the variation is larger than the Maximum Allowance for Starting Date Variation (305), then (Variation of Starting Date)=Maximum Allowance for Starting Date variation (305)) is set. At the step (b05), the estimated value of the starting date is obtained by the equation (2).

(Estimated Value of Starting Date)=(Reference for Starting Date)+(Variation of Starting Date) (2)

At the judgment step (b06), it is judged whether there is actual progress information of similar kind of jobs stored in the Actual Progress Information Data Base 2. If there is, then the step advances to the step (b07); and if the similar kind of jobs is not stored in the Actual Progress Information Data Base 2, then the step advances to the step (b08). At the step (b07), the Reference for Elementary Unit of the objective process is set to the actual elementary unit (Actual Man-Days/Actual Material Quantities). At the step (b08), the Reference for Elementary Unit of the objective process is set to the estimated planned elementary unit (planned Man-Days/planned Material Quantities). At the step (b009), the estimated variation of the elementary unit is computed by using the information of probability distribution model of the variations of the elementary unit corresponding to the kind of the jobs operated in the objective process, wherein the model information is retrieved from the Forecast Model Data Base 3.

Specifically, a reference for the variation is obtained by the equation (3) with the standard normalized random numbers computed by Moro algorism.

(Reference for Parameter)=(Standard Normalized Random Numbers)×(Standard Deviation(307))+(Average (306)) (3)

After judging whether the reference for the variation obtained by the equation (3) is within the range between the Minimum Allowance for Elementary Unit Variation (308) and the Maximum Allowance for Elementary Unit Variation (309), (Variation of Elementary Unit)=(Reference for Variation) is set when the reference for the variation is within such range. And, (Variation of Elementary Unit)=(Minimum Allowance for Elementary Unit (308)) is set if the reference for the variation is smaller than the Minimum Allowance for Starting Date Variation. Moreover, (Variation of Elementary Unit)=Maximum Allowance for Elementary Unit Variation (309)) is set if the reference for the variation is larger than the Maximum Allowance for Starting Date Variation (305). At the step (b10), the estimated value of Elementary Unit is obtained by the equation (4).

(Estimated Value of Elementary Unit)=(Reference for Elementary Unit)+(Variation of Elementary Unit) (4)

At the step (b11), the estimated workdays of the objective process is obtained by the equation (5).

(Estimated Workdays)=(Estimated Elementary Unit)×(Planned Materials Quantities(106)) (5)

By using this estimated workdays, the estimated ending date is obtained by the equation (6).

(Estimated Ending Date)=(Estimated Starting Date)+(Estimated Workdays) (6)

At the step (b12), it is evaluated whether the estimated starting date obtained at the step (b05) and the estimated ending date obtained at the step (b11) satisfy the critical term set for every process stored in the Process Planning Data Base 1. The amendment that (Estimated Starting Date)=(Critical Starting Date (113)) is set if the estimated starting date is earlier than the critical starting date, and (Estimated Ending Date)=(Critical Completion Date (114)) is set if the estimated ending date is later than the critical completion date (114).

At the step (b13), the estimated man-days necessary for the completion of the job of the objective process is computed. It is set as (Estimated Man-days)=(Estimated Workmen (117)) if an amendment has not been done using the critical term in the step (b12), and the estimation man-days is given by derived from the equation (7) (below) if an amendment has been done using the critical term in the step (b12).

(Estimated Man-Days)=(Estimated Elementary Unit)×(Estimated Material)/Amended Workdays (7)

Figure 10:
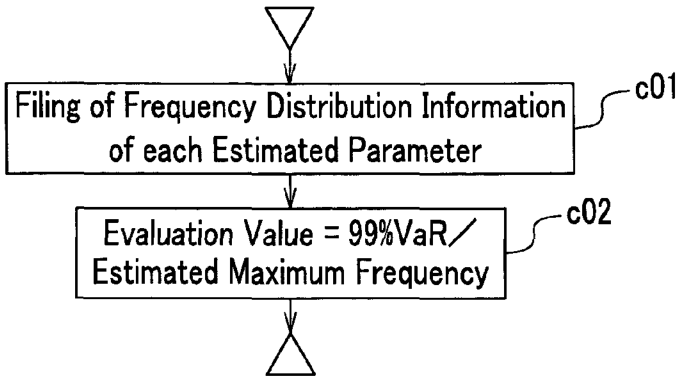
FIG. 10 is a computer-process flow that shows the computation process for evaluation values in an Estimation of Frequency Distribution selected for a project assessment scheme.

FIG. 10 shows the details of the computer process flow (401) when the estimation by frequency distribution (401) is selected for the assessment scheme. At the step (c01), the division unit of the frequency distribution information is obtained by dividing the differences between the maximum and the minimum for every estimated value by the division quantity of the frequency distribution. The frequency distribution information is complied by assembling computation result of the estimated values against the simulation times for each of the above division unit.

(Evaluation Value)=(99% VaR($A$))/(Estimated Maximum Frequency($B$)) (8)

By using this estimation of the frequency distribution, the sensitivity of (99% VaR) is estimated for the large value risk against the average of the estimation values.

Figure 11:
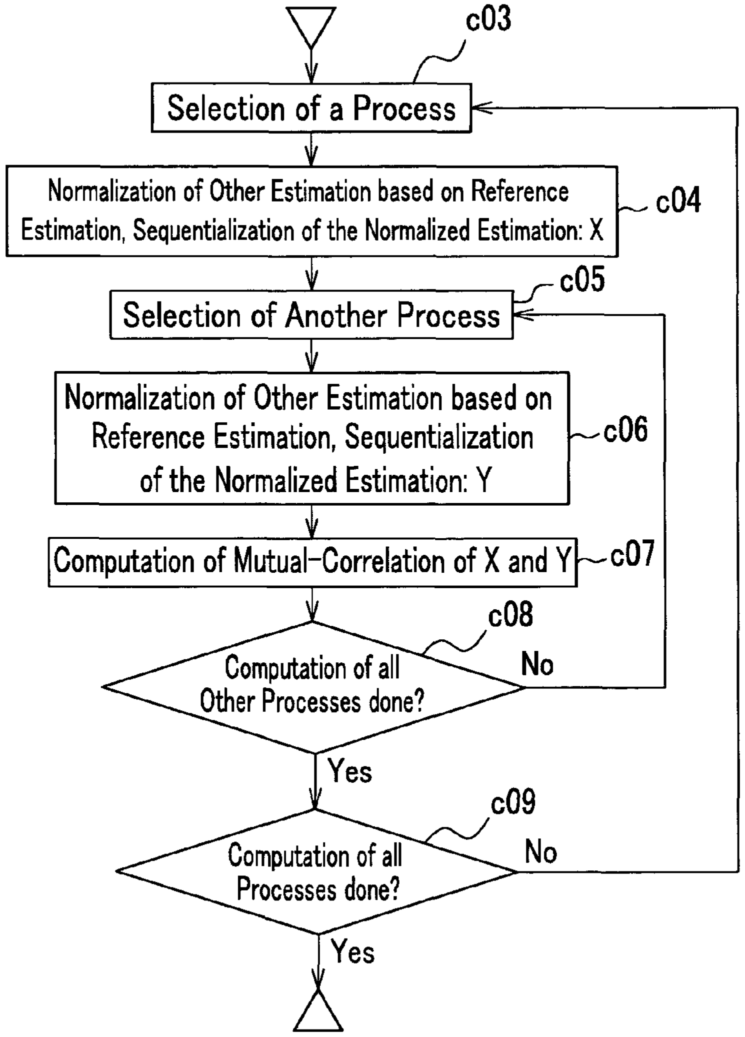
FIG. 11 is a computer-process flow that shows the computation process for evaluation values in an Estimation of Mutual-Correlation of Estimated Value Pattern selected for a project assessment scheme.

The details of the computer process flow at the step (416) will be shown when the Estimation of Mutual-Correlation of Estimated Value pattern (402) is selected for the project assessment scheme shown in FIG. 11. At the step (c03), an arbitral process that is a component of the project is selected.

At the step (c04), the plurality of the estimated values obtained for the process selected in the step (c03) is sequentialized. For example, Estimated Starting Date, Estimated Ending Date, Estimated Elementary Unit, Estimated Man-Days forms a sequence X. An element (Estimated Starting Date for example), which is a component of the sequence X, is chosen as a reference estimate; it is set to unity and, the rests of the numbers are normalized with that reference estimate.

At the step (c05), one of the processes other than the process selected in the step (c03) is selected. At the step (c06), the plurality of estimated values of the process selected in the step (c05) is sequentialized, such as a sequence Y of Estimated Starting Date, Estimated Ending Date, Estimated Elementary Unit, Estimated Man-Days as a sequence Y. An element (Estimated Starting Date for an example), which is a component of the sequence Y, is chosen as a reference estimation; it is set to unity, and the rests of the numbers are normalized with that reference estimation. In this normalization, the kind of the estimated values that are components of the sequence Y, the order of the estimated values in the sequence, and the reference estimate to be selected from the estimated values are computed in the same manner as shown in the step (c04).

At the step (c07), a mutual-correlation between the sequence X obtained in the step (c04) and the sequence Y obtained in the step (c06) is computed. Specifically, the ensemble averages and the square variances of X and Y are defined as E(X), E(Y), V(X) and V(Y), respectively, and (Mutual-Correlation)=$E((X-E(X)(Y-E(Y))/(\sqrt{V(X)}\sqrt{V(Y)})$ (9)

At the judgment step (c08), it is judged whether all processes other than the process selected in the step (c03) have been computed. The step goes back to the step (c05) if all processes other than the selected process have not been computed, and the step advances to the step (c09) if all processes other than the selected process have been computed. At the judgment step (c09), it is judged whether all processes comprising the project have been computed. The step goes back to the step (c03) if all processes have not been computed, and the computational process flow (416) ends if all processes have been computed.

By using this mutual correlation of the estimation of the mutual-correlation of estimated value pattern, it is possible to evaluate the coefficients of the mutual-correlation for each pair of processes.

Figure 12:
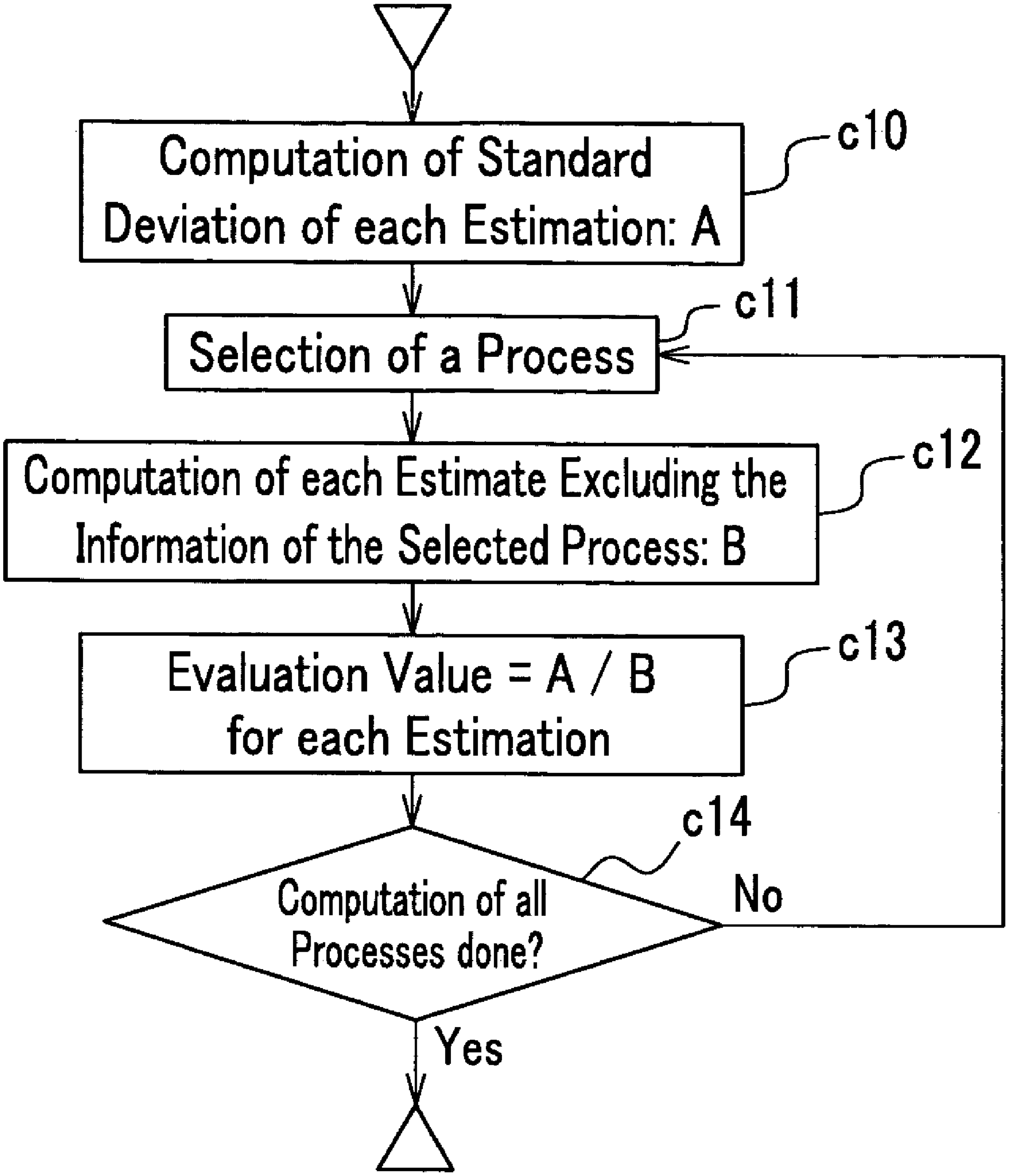
FIG. 12 is a computer-process flow that shows the computation process for evaluation values in an Estimation of Standard Deviation selected for a project assessment scheme.

FIG. 12 shows the details of the computer process flow (416) when the Estimation of Standard Deviation (403) is selected for the project assessment scheme. The following computer processes are done for all estimated values (Estimated Starting Date, Estimated Ending Date, Estimated Elementary Unit, etc.) which are the objective values of the objective processes for evaluation.

At the step (c10), the standard deviations (A) of the above estimated values are computed by using a simulation time for each estimation value. At the step (c11), an arbitral process which is a component of the objective process is selected. At the step (c12), the standard deviation values (B) of the above estimation values, by using the information of the project excluding the project selected in the step (c11), are computed.

At the step (c13), the evaluation value is computed by using the equation (10) with the standard deviation (A) computed in the step (c10) and the standard deviation computed in the step (c12).

$$(\text{Evaluation Value})=(\text{Standard Deviation } A)/(\text{Standard Deviation } B) \quad (10)$$

At the judgment step (c14), it is judged whether all processes comprising the objective project have been computed. The step goes back to the step (c11) if all processes have not been computed, and the computational process flow (416) ends if all processes have been computed.

It is possible to assess the influence of each process against the all standard deviation by using this estimation of the standard deviation.

Figure 13:
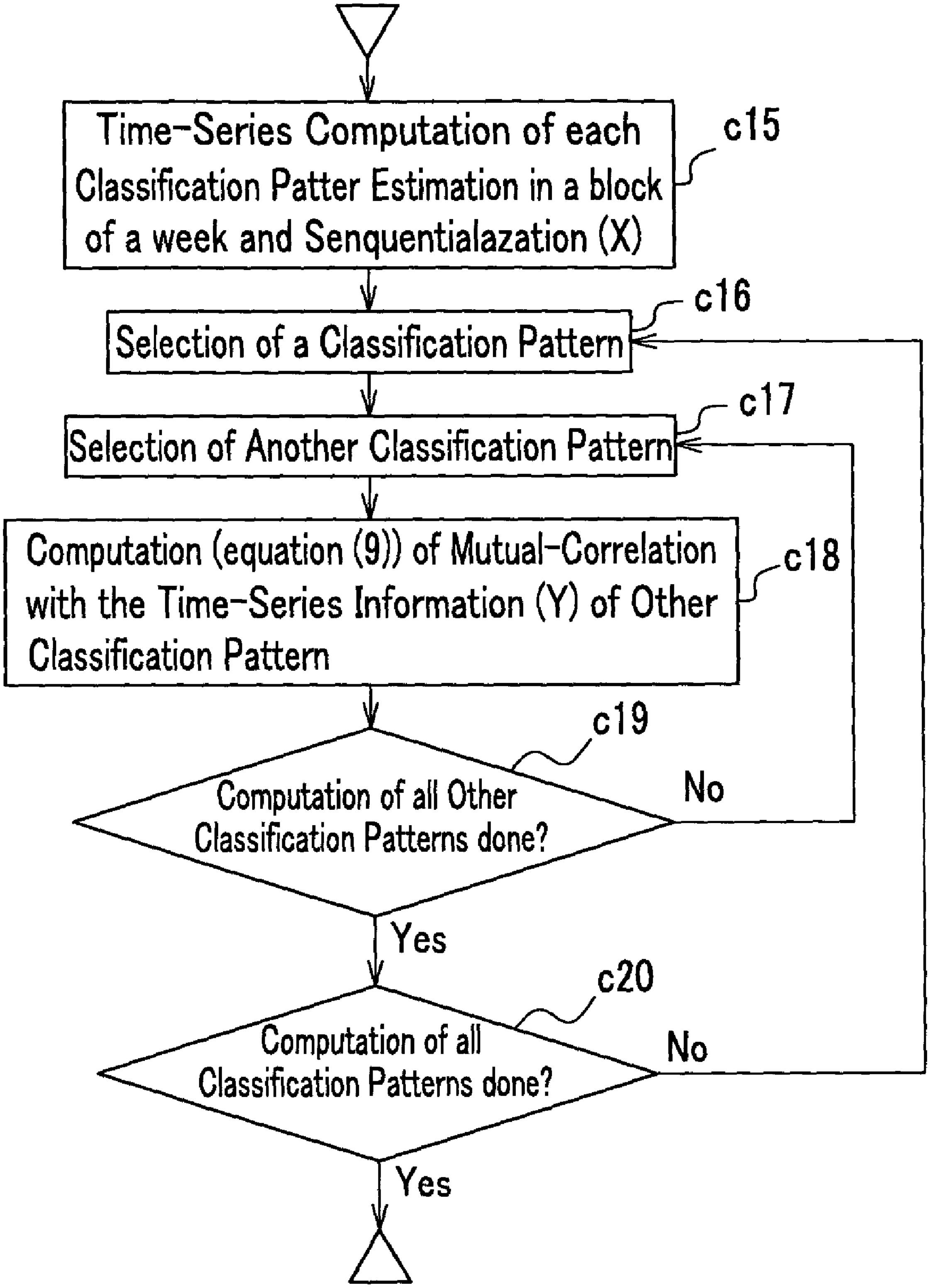
FIG. 13 is a computer-process flow that shows the computation process for evaluation values in an Estimation of Time-Series Information selected for a project assessment scheme.

FIG. 13 shows the details of the computer process flow (416) when the Estimation of Time-Series Information (404) is selected for the project assessment scheme. The following computer processes are done for all estimated values (Estimated Starting Date, Estimated Ending Date, Estimated Elementary Unit, etc.) which are the objective values for evaluation regarding the objective processes.

At the step (c15), the estimated values for an arbitral classification pattern (workmen, work area, objective part used in the job, etc.) of every group of the processes composing the project are computed for everyone week, and the estimation values are sequentialized in a form of time-series (X). At the step (c16), an arbitral classification pattern is selected among the above classification patterns. At the step (c17), an arbitral classification patterns other than the pattern selected in the step (c16) is selected. At the step (c18), the mutual-correlation between the time-series information X (computed in the step (c15)) of the classification pattern selected in the step (c16) and the time-series information Y (computed in the step (c15)) of the classification pattern selected in the step (c17) is calculated.

At the judgment step (c19), it is judged whether all classification patterns other than the classification pattern selected in the step (c16) have been computed. The step goes back to the step (c17) if all classification patters other than the classification patter selected in the step (c16) have not been computed, and the step advances to the step (c20) if all classification patterns other than the classification patter selected in the step (c16) have been computed. At the judgment step (c20), it is judged whether all classification patterns have been computed. The step goes back to the step (c16) if all classification patters have not been computed, and the computational process flow (416) ends if the all classification patterns have been computed.

By using the time-series information estimation, it is possible to evaluate the coefficients of the mutual-correlation for each pair of classification patterns based on the time-series information.

Figure 14:
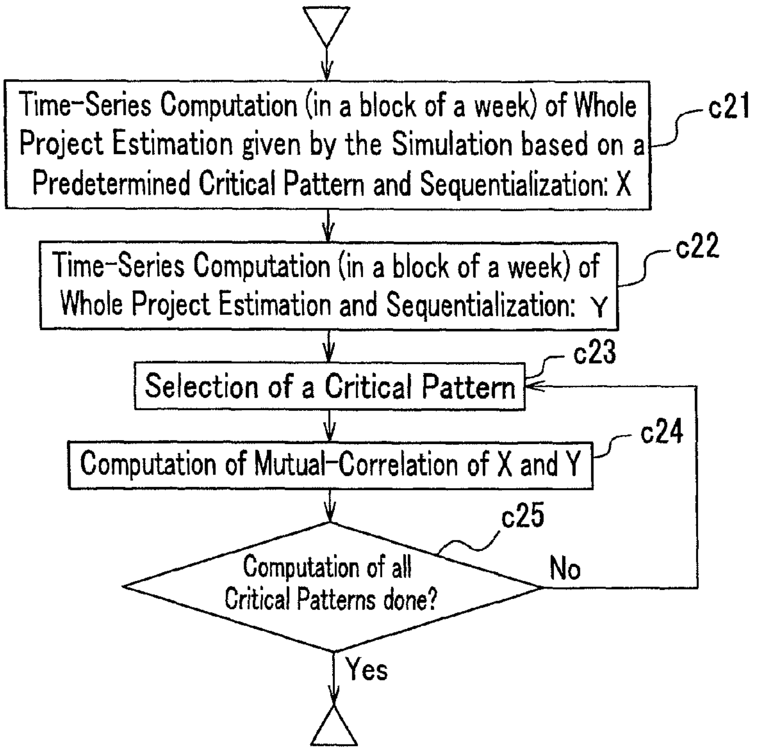
FIG. 14 is a computer-process flow that shows the computation process for evaluation values in an Estimation of Fit to Predetermined Pattern selected for a project assessment scheme.

FIG. 14 shows the details of the computer process flow (416) when the Estimation of Fit to Predetermined Pattern (405) is selected for the project assessment scheme. At the step (c21), a simulation is done based on the expectation that the predetermined critical pattern (Shortage of Man-Days, Delay of Completion, Large Change of Specifications, Large Supplementation of Specifications) becomes a possible incidental problem to occur the project. The simulation is carried out for every critical pattern. For example, the delivery schedule of parts to be used for the job consistently includes a 10% delay for the case of completion delay. Every estimation value for the simulation (as Process Term, Elementary Unit, Cost, Man-Days, etc.) for every one week is sequentialized for every critical pattern.

At the step (c22), the simulation is carried out based on the information of the actual progress of the project and every estimated value for every one week is sequentialized. At the step (c23), one of the patterns is arbitrarily selected. At the step (c24), X, belonging to the critical pattern selected in the step (c23), and Y, computed in the step (c22) (and both are among the time-series information computed in the step (c21)), are selected for every estimated value. And the mutual correlation coefficient given by the equation (9) is computed. At the judgment step, it is judged whether all of the predetermined critical patterns have been processed. The step goes back to the step (c23) if all critical patters have not been computed, and the computational process flow (416) ends if the all critical patterns have been computed.

By using this assessment scheme for the estimated fit to the predetermined pattern, it is possible to evaluate how much the present project fits to the predetermined pattern.

Figure 15:
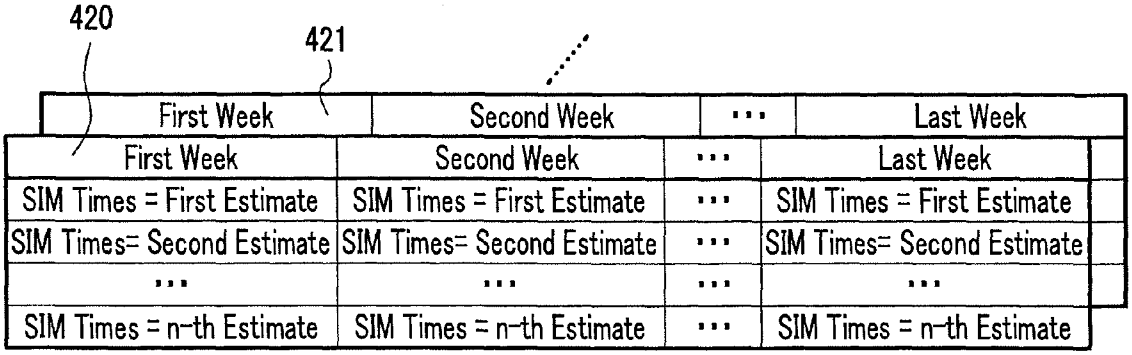
FIG. 15 is a data format of estimated values.

FIG. 15 shows the format of the output data regarding to the estimated values output at the step (417). In this simulation, the estimated values (the estimated value of starting date (420) and the estimated value of ending date (421), etc.) are computed by the simulation for each week, and the results are output. The computed results are output according to the amount of the simulation times set by the user.

FIG. 16 shows the format of the output data of the evaluation values output in the step (417) when the Estimation of Frequency Distribution (401) is selected for the project assessment scheme. The computed estimated values calculated in steps shown in FIG. 10 (Starting Date (422), Ending Date (423), Elementary Unit (424), Man-Days (425)) are output.

FIG. 17 shows the format of the output data of evaluation values output in the step (417), when the Estimation of Mutual-Correlation of Estimated Value Pattern (402) is selected for the project assessment scheme. As for more details, the Mutual-Correlation Coefficients (426) between two processes that are components of the objective project are output as evaluation values in a matrix form as shown in FIG. 17.

FIG. 18 shows the format of the output data of the evaluation values output in the step (417) when the Estimation of Standard Deviation (403) is selected for the project assessment scheme. As for more details, the Evaluation Values (427) of the standard deviations computed by the information excluding an arbitral process and the standard deviation computed by the information including all processes are output against the index that is the process arbitrarily excluded in such computation.

FIG. 19 shows the format of the output data of the evaluation values output in the step (417) when the Estimation of Time-Series Information (404) is selected for the project assessment scheme. As for more details, the mutual-correlation coefficients for job groups computed for the estimated values (Elementary Unit (428), Accumulation Man-Days (429), Accumulation Day (430), Accumulation Cost (4331), etc.) computed in the computer process as shown in FIG. 13 are output as evaluation values in a matrix form as shown in FIG. 19.

FIG. 20 shows the format of the output data of the evaluation values output in the step (417) when the Estimation of Fit to Predetermined Pattern (405) is selected for the project assessment scheme. As for more details, the fit is computed based on the estimated values (Task Operation Term (432), Elementary Unit (428), Cost (434), Man-Days (435), etc.). The mutual-correlation coefficients between the estimated values of the entire project and the estimated values computed by the simulation carried out under the critical patterns (Shortage of Man-Days (436), Delay of Completion (437), etc.) are computed by the computer process flow as shown in FIG. 14, and are output in a matrix form as shown in FIG. 20.

Figure 21:
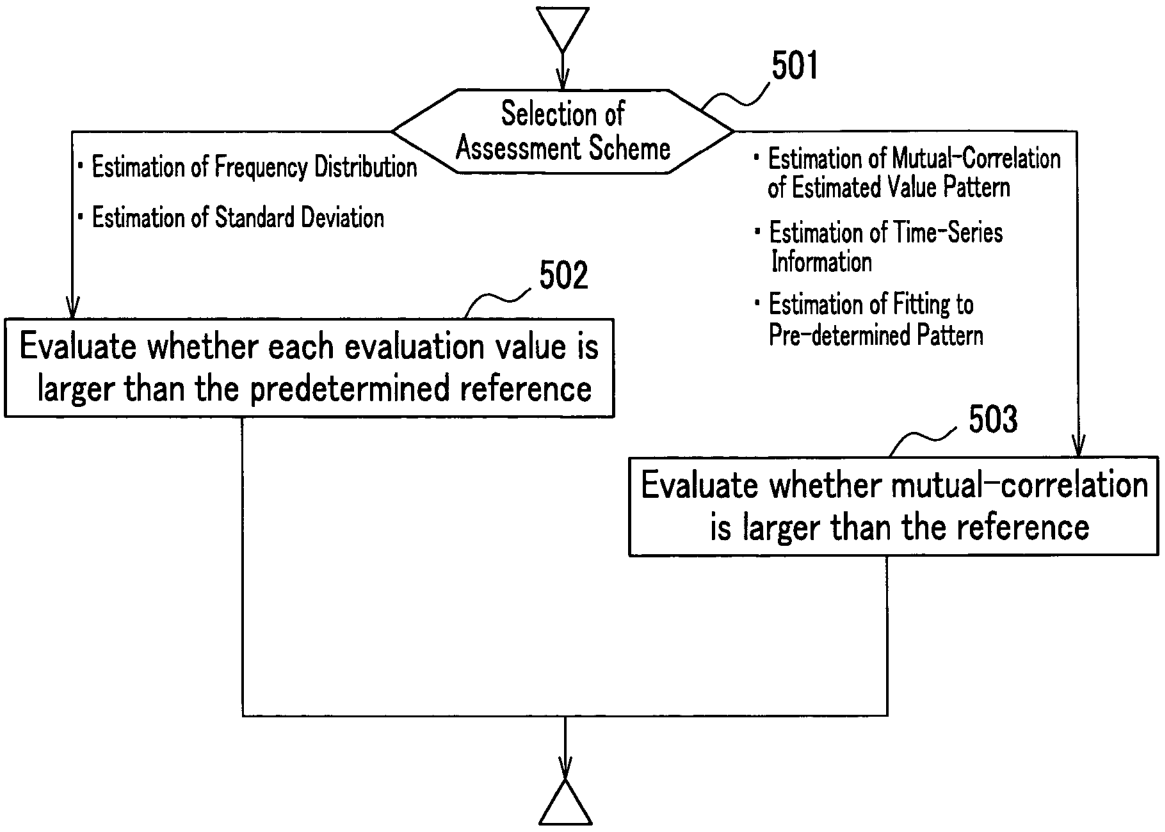
FIG. 21 is a computer-process flow that shows the process flow of a Project Assessment Device.

FIG. 21 shows the computer process flow implemented by the process assessment device of the present invention. At the step (501), a preparatory setting is done for the selection of the project assessment scheme among the Estimation of Frequency Distribution (401), the Estimation of Standard Deviation (403), the Estimation of Mutual-Correlation of Estimated Value Pattern (402), Estimation of Time-Series Information (404) or Estimation of Fit to Predetermined Patter (405). For the cases of the Estimation of Frequency Distribution (401) or the Estimation of Standard Deviation (403), the step goes to the step (502). For the cases of the Estimation of Mutual-Correlation of Estimated Value Pattern (402), Estimation of Time-Series Information (404) or Estimation of Fit to Predetermined Patter (405), the step goes to the step (503). At the step (502), it is judged whether the evaluation values are more than the references set for the estimated values. At the step (503), it is judged whether the computed mutual-correlation coefficients are more than the predetermined reference.

Figure 22:
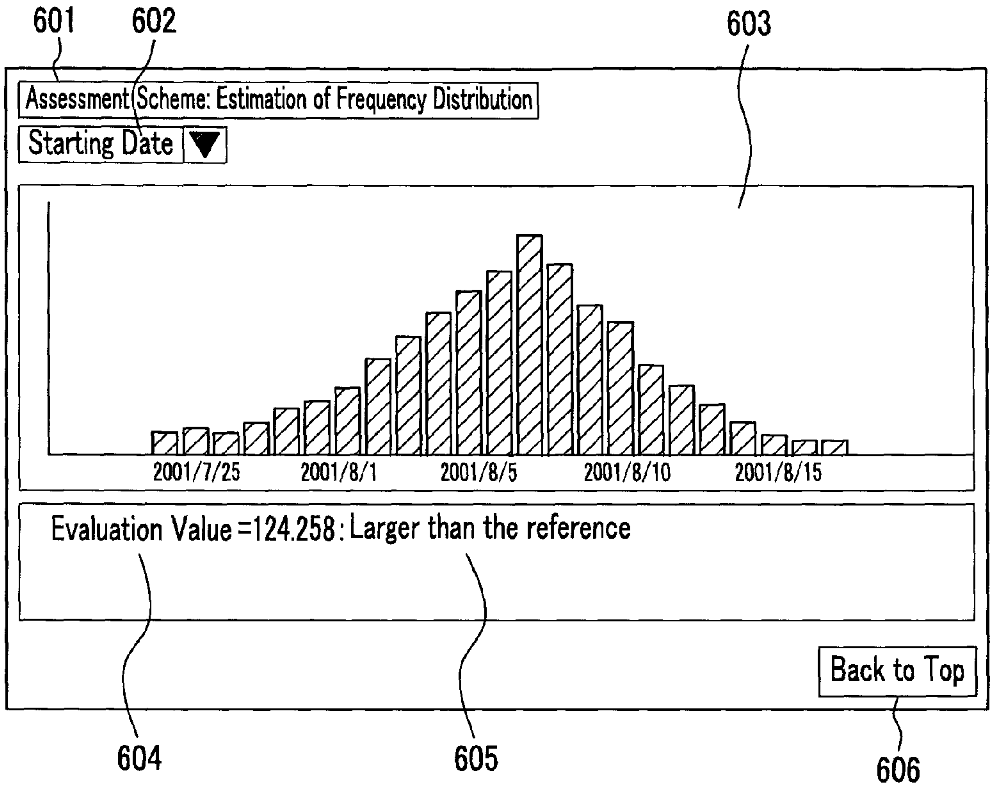
FIG. 22 is an explanatory drawing of the graphic presentation of a Display Device of Assessment Result for an Estimation of Frequency Distribution.

FIG. 22 shows an example of graphic display presentation in the Display Device of Assessment Result 6 when the Estimation of Frequency Distribution (401) is selected for the project assessment scheme. In the display box for the assessment scheme (601), the information of the selected project assessment scheme is displayed (this is common to the examples shown below). In the selection menu of the estimated values 602, an estimated value is selected among a list of computed estimated values. In the display box of the frequency distribution, the histogram of frequency distribution of the estimated values selected in the selection menu 602 is presented. In the display box for evaluation information 505, the evaluation values 604 of the estimated values selected in the estimated value selection menu and the evaluation values evaluated in the Project Assessment Device 5 are displayed. When the "back to top" button 606 is selected, the display goes back to the selection of the project assessment (this is same as for the following examples of the graphic display presentation).

In this method, the project can be assessed by using the graphic pattern presented by the histogram of the frequency distribution of the selected estimated values.

Figure 23:
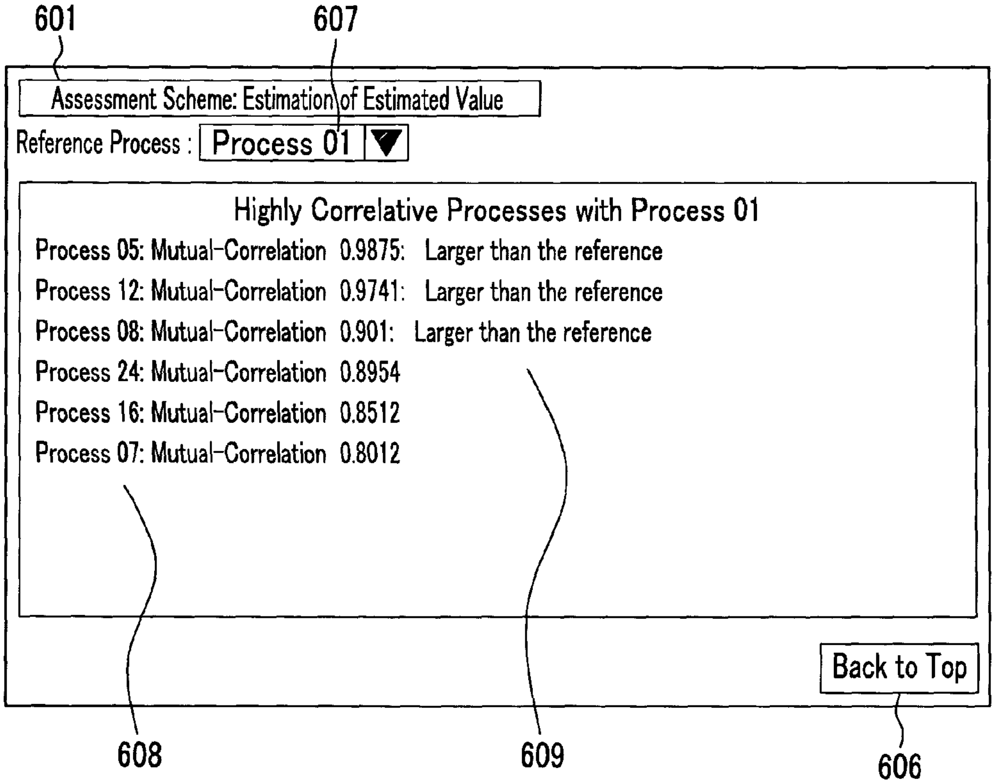
FIG. 23 is an explanatory drawing of the presentation of a Display Device of Assessment Result for an Estimation of Mutual-Correlation of Estimated Value Pattern.

FIG. 23 shows an example of graphic display presentation in the Display Device of Assessment Result 6 when the Estimation of Mutual-Correlation of Estimated Value Pattern (402) is selected for the project assessment scheme. In the selection menu of reference process (607), a reference process for evaluation is selected from a list that includes the processes comprising the project. In the display box of evaluated values, the process names and the mutual-correlation coefficients 608 for the process groups that have the larger mutual-correlation coefficients than the predetermined values and the assessment results 609 of the mutual-correlation coefficients obtained by the Project Assessment Device 5 are shown.

In this method, the project can be assessed by obtaining the estimated variations of the other process that has a positive mutual-correlation with the estimated variation pattern of the reference using the graphic pattern presented by the histogram of the frequency distribution of the estimated values that have been selected.

Figure 24:
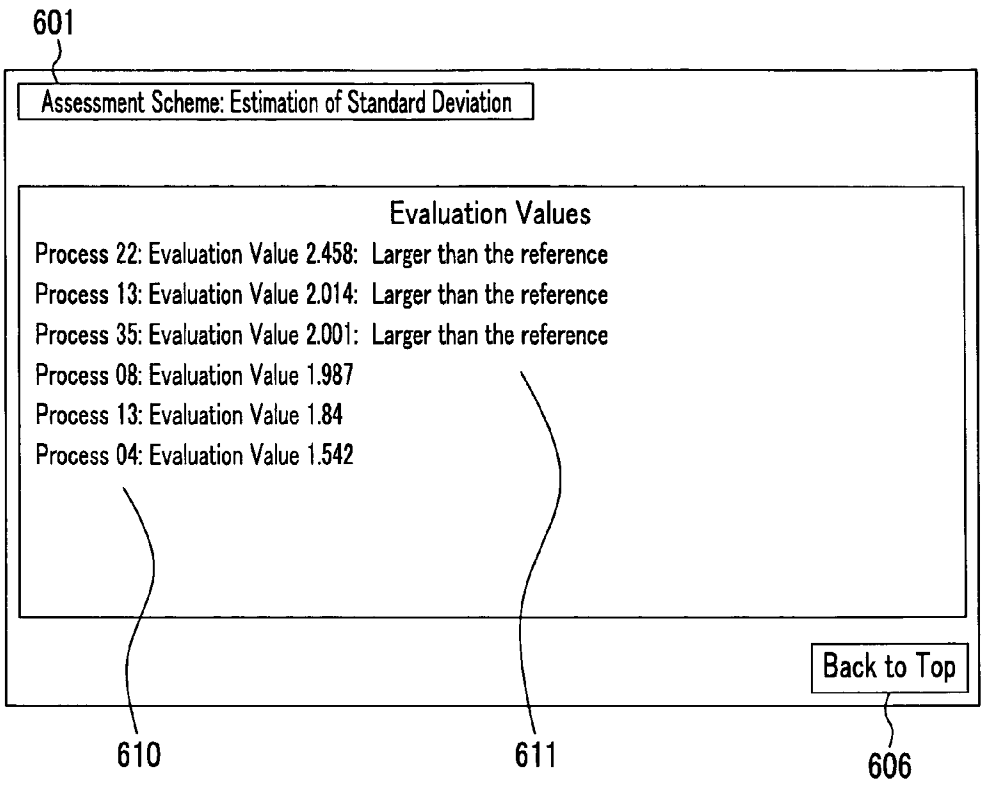
FIG. 24 is an explanatory drawing of the presentation of a Display Device of Assessment Result for an Estimation of Standard Deviation.

FIG. 24 shows an example of graphic display presentation in the Display Device of Assessment Result 6 when the Estimation of Standard Deviation (403) is selected for the project assessment scheme. In the display box for the assessment information, the name and the evaluation values 610 of the project that is excluded in the evaluation values and the results 611 that are assessed by the Project Assessment Device 5 are shown.

In this method, the project can be assessed by computing the standard deviations of summation of all process against an arbitral estimated variation subtracted from the above estimated variation based on the plurality of estimation results and subtracting among these standard deviations.

Figure 25:
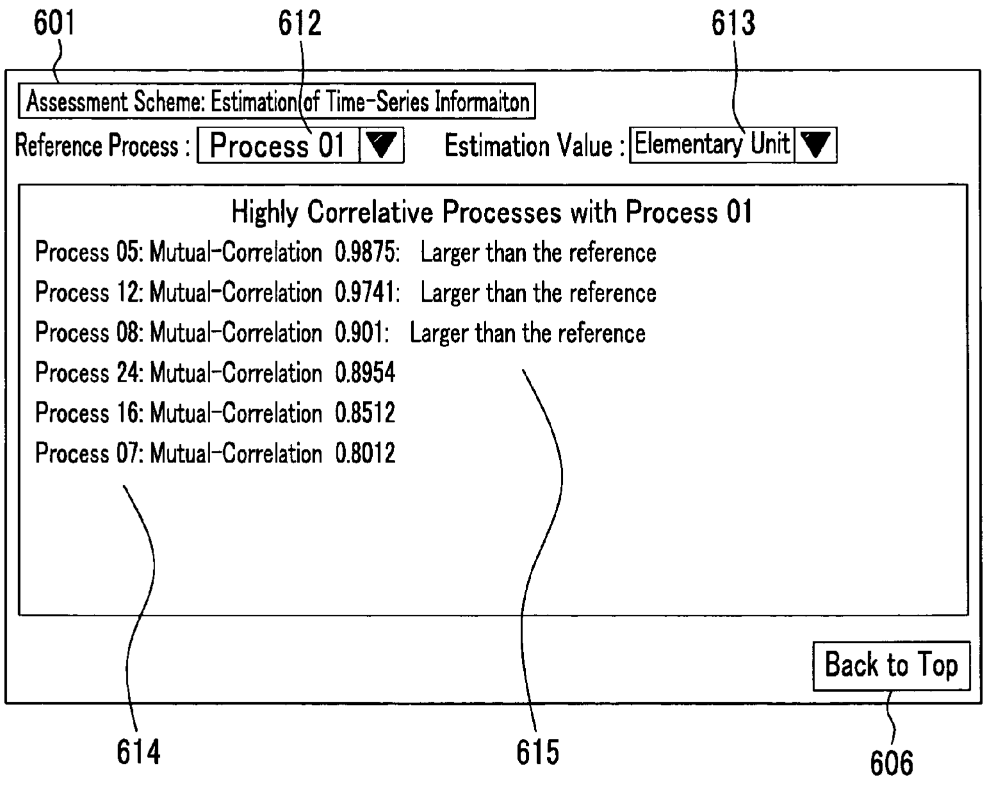
FIG. 25 is an explanatory drawing of the presentation of a Display Device of Assessment Result for an Estimation of Time-Series Information.

FIG. 25 shows an example of graphic display presentation in the Display Device of Assessment Result 6 when the Estimation of Time-Series Information (404) is selected for the project assessment scheme. In the selection menu of reference process 612, a process which can be the reference for evaluation is selected from a list of menu that includes the processes composing the project. In the selection menu of the estimated values 613 that is an objective to be evaluated, the estimated values are selected from a list of a menu that includes the computed estimated values. In a display box of evaluated values information, the mutual-correlation coefficients of the time-series information of the estimated values that are selected from the selection menu of the estimated values 613 that is an objective to be evaluated, wherein the coefficients are larger than a certain value, are assessed by the Project Assessment Device 5 for the reference process selected in the selection menu 612 of reference process. The name of the process, the mutual-correlation coefficient 614 and the result 615 of the mutual-correlation coefficient are displayed.

In this method, the project can be assessed by using the time-series data of the actual progress information up to the assessment time, the time-series estimated variations after the assessment time and the mutual-correlation information between every two processes.

Figure 26:
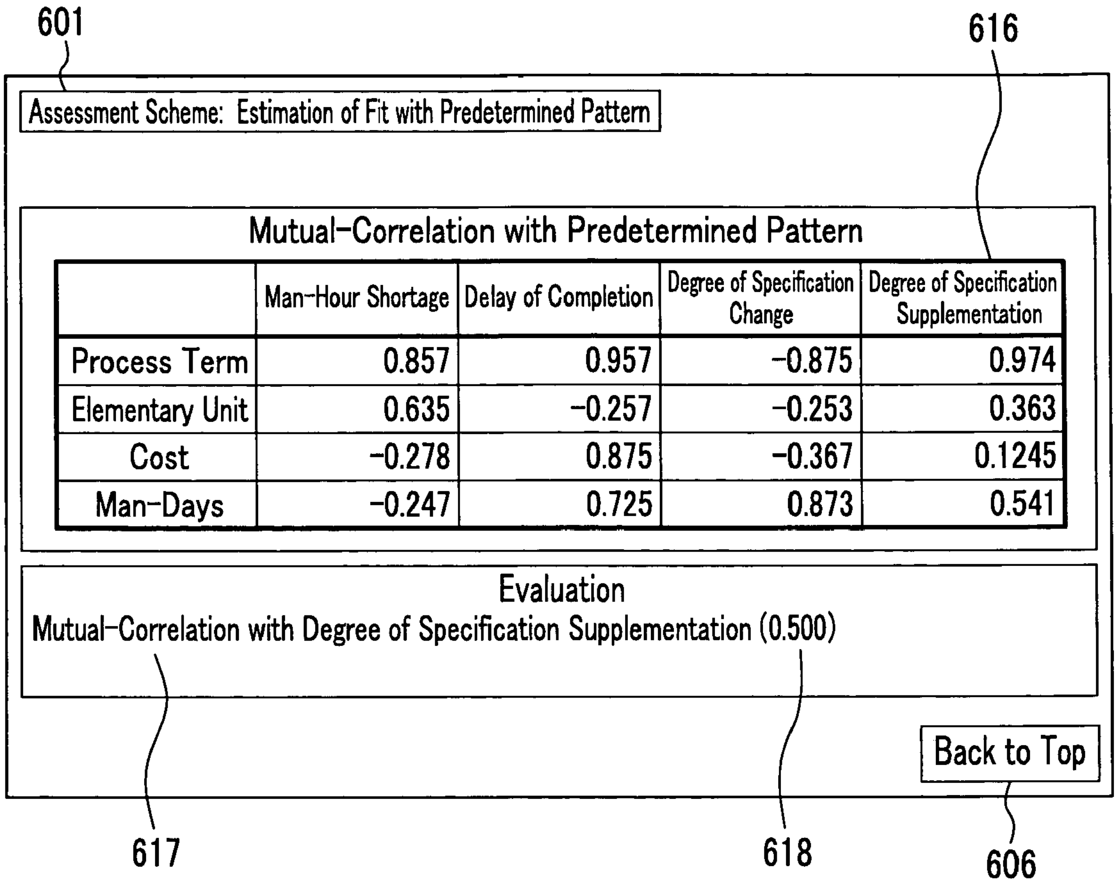
FIG. 26 is an explanatory drawing of the presentation of a Display Device of Assessment Result for an Estimation of Fit to Predetermined Pattern.

FIG. 26 shows an example of graphic display presentation in the Display Device of Assessment Result 6 when the Estimation of Fit to Predetermined Pattern (405) is selected for the project assessment scheme. In the display box 616 for the mutual-correlation with a predetermined pattern, the coefficient of mutual correlation with every critical pattern (Shortage of Man-Days, Delay of Completion, Large Change of Specifications, Large Supplementation of Specifications) for each of estimated value (Task Operation Term, Elementary Unit, Cost, Man-Days, etc.) is displayed in a form of a matrix. In the display box for evaluation information, the name 617 of the critical pattern, of which average of the coefficient of the mutual-correlation with the estimated value for every critical pattern is larger than a predetermined value, and the average of the coefficients of the mutual-correlations are displayed.

In this method, a critical ranges are set for the variation of parameters regarding starting date, ending date, job volume, man-days, job materials, cost. Then the project can be assessed by computing the degree of the mutual correlation based on the time-series data and by using the critical information for the correlated results.

The embodiments that have been explained above are discussed with examples of construction tasks in a civil engineering, etc. However, the present invention is not limited within these examples but applicable to the project assessment of software program development, the process assessment of the operation schedules of traffic vehicles, the process assessment of the semiconductor manufacturing process, etc.

Figure 27:
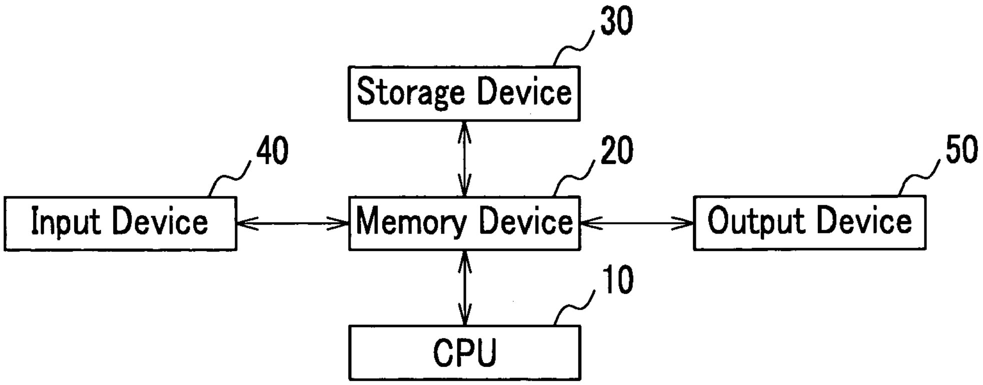
FIG. 27 is a drawing of a composition of a hardware system of a project assessment system shown in FIG. 1.

FIG. 27 shows a hardware design to actually perform the present computer process flow of the present invention. The system includes a computer comprising a CPU 10, a Memory Device 20, a Storage Device 30, an Input Device 40 and an Output device 50. The program of the present invention and the data base stored in the Storage Device 30 are transferred to a Memory Device 20. The Input Data of the project given by the Input Device 40 is processed in CPU 10 based on the instruction information input through the Input Device 40, and the result is displayed on the Output Device 50. The Input Device 40 includes communication apparatus through which the input data sent on the network are received.

In comparison to FIG. 1, the Process Planning Data Base 1, the Actual Progress Information Data base 2 and the Forecast Mode Data Base are stored in the Storage Device 30. The procedures for the project assessment method of which fundamental concept is drawn out in FIG. 2 and the detail operation and the functions described in FIG. 8 to FIG. 14 and FIG. 21 are stored in the storage device 30 as a set of computer programs. The Forecast Estimation Computation Device 4 and the Project Assessment Device 5 are realized by the CPU 10 and the Memory Device 20. The Display Device of Assessment Result is realized by the Output Device 50.

The present invention allows assessing the project (clarification of both problems and superior aspects) using the practical estimation on the basis of quantitative indications.

What is claimed is:

1. A computer readable storage medium encoded with a project assessment program for assessing a project comprising a plurality of processes when executed by a computer computing forecasts of said project based on a set of information, comprising:

selecting at least one scheme by a user input from the group of schemes comprising of an estimation of frequency distribution, an estimation of mutual-correlation of estimated value pattern, an estimation of standard deviation, an estimation of time-series information, and an estimation of fit to a predetermined pattern;

based on the at least one selected scheme, retrieving:

process planning information of each process included in the project;

up-to-date actual process information of said each process of the project, forecast model information of said each process of the project defined as probability distribution variations of a plurality of parameters of said processes, wherein the probability distribution variations are quantitative values of the project, computing estimated values of variations in at least two parameters of said processes using the process planning information, the up-to-date actual process information and the forecast model information, wherein the estimated values of variations are different from the probability distribution variations, wherein the estimated values of variations are computed using the probability distribution variations, the probability distribution variations are determined by using standard normalized random numbers computed by a Molo algorithm, assessing the project by determining one of either said estimated values of parameters of at least one process of the processes included in the project, or a comparison of said estimated values of variations to a predetermined criterion;

wherein in the scheme of the estimation of mutual-correlation of estimated value pattern, a first process is selected from the processes of the project, estimated values of variations calculated for the first process are put into a sequence, one of estimated values of the variations is set as a first reference estimated value, and other estimated values of the variations of the first process are normalized based on the first reference estimated value so as to obtain a sequence X, a second process is selected from the processes of the project, estimated values of the variations calculated for the second process are put into a sequence, one of the estimated values of the variations is set as a second reference estimated value, and other estimated values of the variations of the second process are normalized based on the first reference estimated value so as to obtain a sequence Y, a mutual-correlation between the sequence X and the sequence Y is computed to assess how high the mutual-correlation therebetween is, thereby to find the estimated values of the variations by equation:

$$(\text{Mutual-Correlation})=E((X-E(X)(Y-E(Y))/(\sqrt{V(X)}\sqrt{V(Y)})$$

wherein, ensemble averages of the sequences X and Y are defined as E(X) and E(Y), and square variances of the sequences X and Y are defined as V(X) and V(Y), respectively.

2. The computer readable storage medium as defined in claim 1, wherein said parameters include at least one of starting date, ending date, job volume, workdays, man-days, material quantities or cost.

3. The computer readable storage medium as defined in claim 1, wherein said computing function further includes creating graphs of frequency distribution for the forecasts of the variations of the parameters obtained by using random numbers are created, and using patterns of the graphs so as to assess the project.

4. The computer readable storage medium as defined in claim 1, wherein said computing function further includes, based on the forecasts of the variations of the parameters obtained by using random numbers, finding a variation pattern of the forecasts of the variations for one process of the processes of the project, and finding variations for another processes of the project, whose variation pattern has a positive mutual correlation with said found variation pattern, thereby to assess the project.

5. The computer readable storage medium as defined in claim 1, wherein said computing function further includes, based on the forecasts of the variations of the parameters obtained by using random numbers, computing standard deviations (A) of estimated values of a plurality of parameters of objective processes, and standard deviations (B) of estimated values of the plurality of parameters of the objective processes excluding an arbitral process selected by an user, and further using the standard deviations (A) and the standard deviation (B) to assess the project.

6. The computer readable storage medium as defined in claim 1, wherein said computing function further includes computing a time-series data of variations of said parameters based on said actual progress information, up to a time of carrying out assessment, and a time-series data of said variations of said parameters from a time of carrying out assessment to a future time, and the assessing function makes the determination base in part on mutual correlations between the time-series data.

7. The computer readable storage medium as defined in claim 1, wherein said computing function further includes computing, by using a group of time-series data comprising of time-series data of variations of said parameters based on said actual progress information, up to a time of carrying out assessment, and time-series data of said variations of said parameters from a time to carry out assessment to a future time, a degree of mutual correlation of a said group of time-series data by setting a specific critical condition for variation range of at least one of said parameters among starting date, ending date, job volume, workdays, man-days, material quantities and cost, and the assessing function makes the determination base in part on the degree of mutual correlations between the time-series data.

* * * * *